United States Patent [19]
Cavallaro et al.

[11] Patent Number: 6,133,946
[45] Date of Patent: Oct. 17, 2000

[54] SYSTEM FOR DETERMINING THE POSITION OF AN OBJECT

[75] Inventors: Richard H. Cavallaro, Mountain View, Calif.; Jerry N. Gepner, Langhorn, Pa.; James R. Gloudemans, San Mateo; Stanley K. Honey, Palo Alto, both of Calif.; William F. Squadron, Scarsdale, N.Y.; Marvin S. White, San Carlos, Calif.

[73] Assignee: Sportvision, Inc., New York, N.Y.

[21] Appl. No.: 09/041,238

[22] Filed: Mar. 11, 1998

Related U.S. Application Data

[60] Provisional application No. 60/070,594, Jan. 6, 1998.

[51] Int. Cl.[7] .................................................. H04N 7/18
[52] U.S. Cl. ............................. 348/135; 348/157; 702/166
[58] Field of Search ............................... 348/47, 77, 135, 348/157, 169; 702/166; 364/516, 562, 565; 345/430; H04N 7/18

[56] References Cited

U.S. PATENT DOCUMENTS

| | | | |
|---|---|---|---|
| 3,580,993 | 5/1971 | Sandorf et al. .............................. | 178/6 |
| 3,840,699 | 10/1974 | Bowerman ................................ | 178/6.8 |
| 4,179,704 | 12/1979 | Moore et al. .............................. | 358/22 |
| 4,521,196 | 6/1985 | Briard et al. ............................... | 434/20 |
| 4,591,897 | 5/1986 | Edelson ..................................... | 358/22 |
| 4,700,306 | 10/1987 | Wallmander ............................. | 364/449 |
| 4,839,524 | 6/1989 | Ando ........................................ | 364/516 |
| 4,893,182 | 1/1990 | Gautraud et al. ........................ | 358/105 |
| 4,999,709 | 3/1991 | Yamazaki et al. ....................... | 358/160 |
| 5,150,895 | 9/1992 | Berger ................................... | 273/29 R |
| 5,179,421 | 1/1993 | Parker et al. ............................. | 356/152 |
| 5,264,933 | 11/1993 | Rosser et al. ............................ | 358/183 |
| 5,268,734 | 12/1993 | Parker et al. ............................. | 356/152 |
| 5,346,210 | 9/1994 | Utke et al. ............................... | 273/55 R |
| 5,413,345 | 5/1995 | Nauck .................................. | 273/185 R |
| 5,419,562 | 5/1995 | Cromarty .............................. | 273/183.1 |
| 5,459,793 | 10/1995 | Naoi et al. .............................. | 382/165 |
| 5,513,854 | 5/1996 | Daver ...................................... | 273/454 |
| 5,675,516 | 10/1997 | Bone et al. ............................. | 364/562 |
| 5,724,265 | 3/1998 | Hutchings .............................. | 364/565 |
| 5,841,441 | 11/1998 | Smith ...................................... | 345/430 |

FOREIGN PATENT DOCUMENTS

| | | |
|---|---|---|
| WO 95/10915 | 4/1995 | WIPO . |
| WO 95/10919 | 4/1995 | WIPO . |
| WO 97/02699 | 1/1997 | WIPO . |

OTHER PUBLICATIONS

New Jump Measurement Revised Program, source code, Jul. 11, 1995—see attached Remarks.

Digital Ski Jump, www.nextstep.com, 1995.

*Primary Examiner*—Howard Britton
*Attorney, Agent, or Firm*—Fliesler, Dubb, Meyer & Lovejoy LLP

[57] ABSTRACT

A system determines the vertical position of an object and report that vertical position in a format suitable for use on a television broadcast, a radio broadcast, the Internet or another medium. One example of a suitable use for the system includes determining the height that a basketball player jumped and adding a graphic to a television broadcast that displays the determined height. The system includes two or more cameras that capture a video image of the object being measured. The object's position in the video images is determined and is used to find the three dimensional location of the object. The three dimensional location includes a height coordinate. In some cases, the height coordinate is the desired vertical position. In other cases, the height or size of the object may be subtracted from the height coordinate to determined the vertical position.

46 Claims, 5 Drawing Sheets

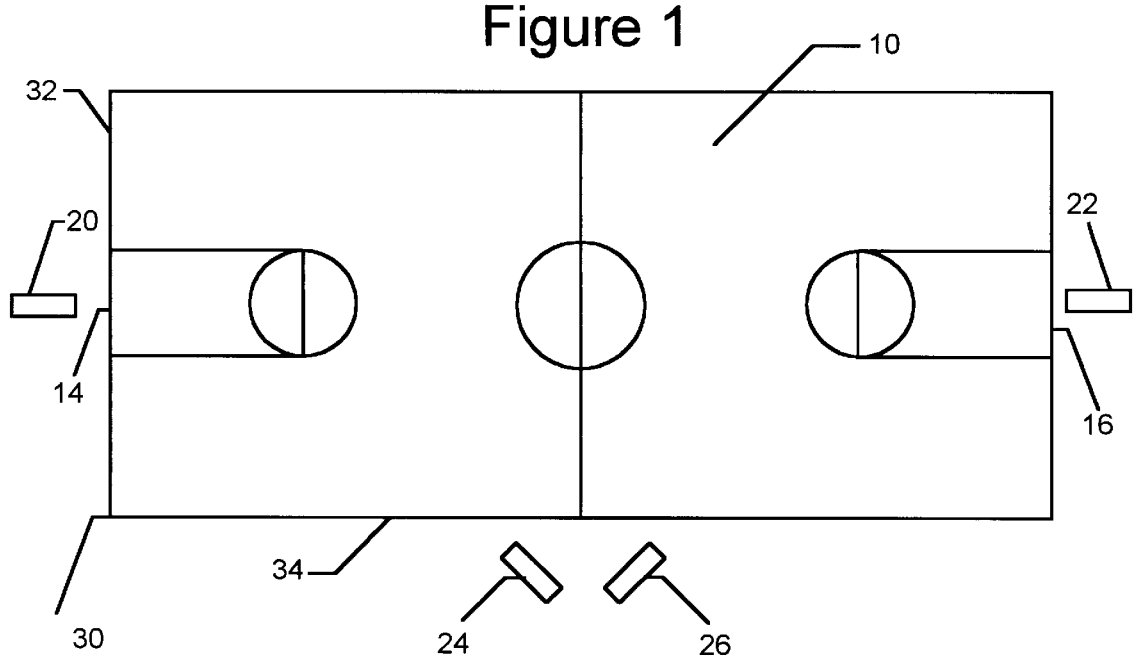
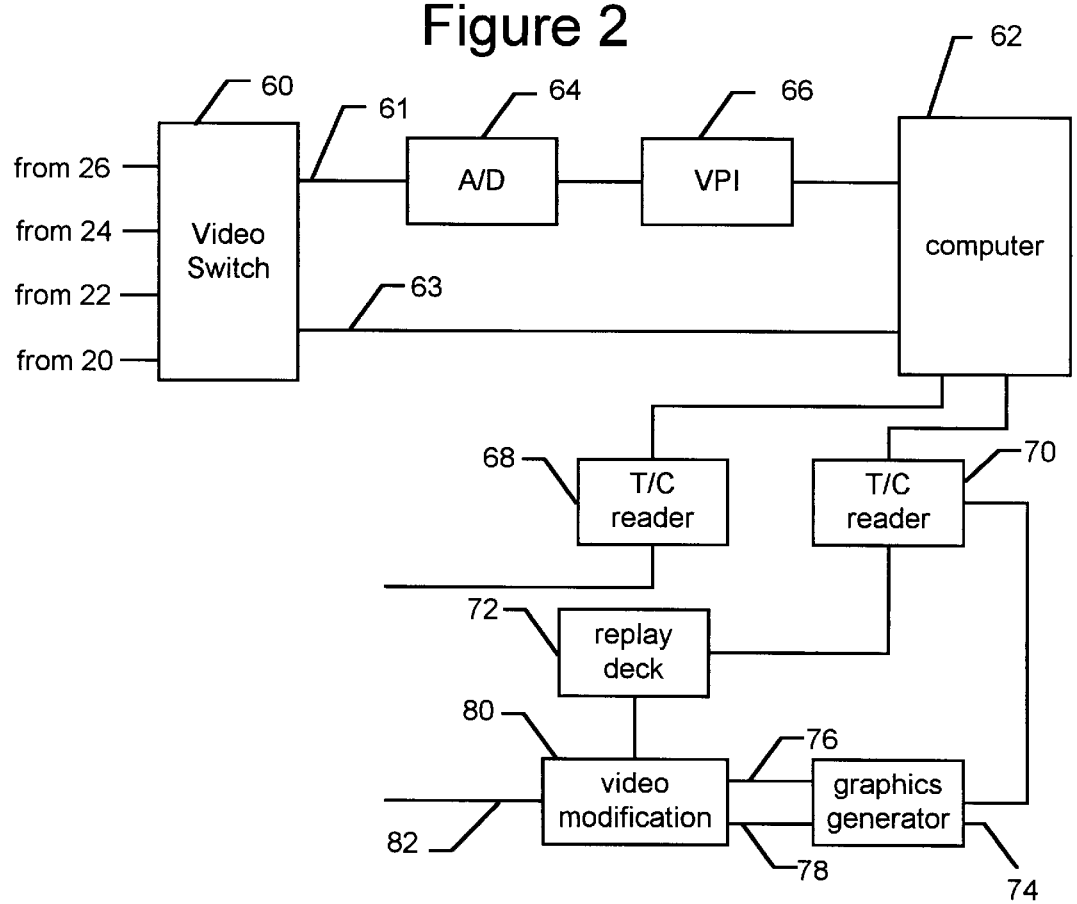

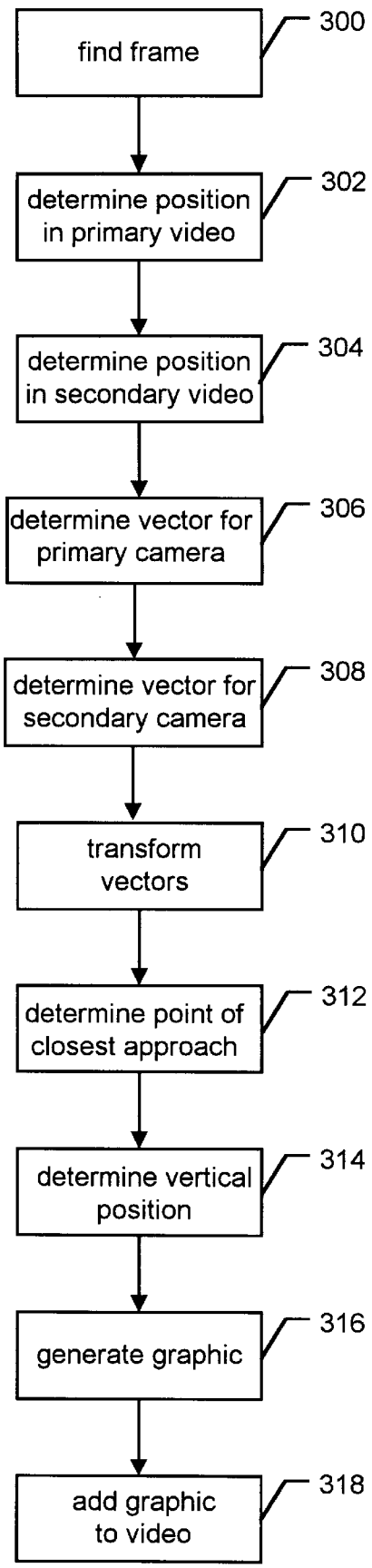
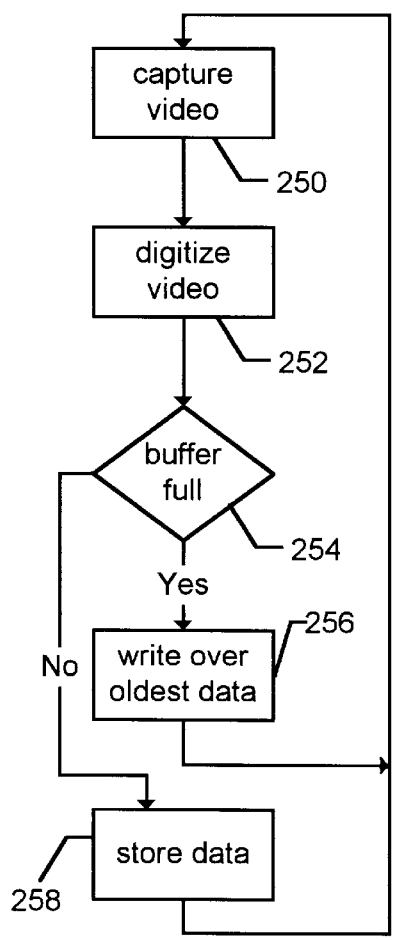

SYSTEM FOR DETERMINING THE POSITION OF AN OBJECT

This application claims the benefit of U.S. Provisional Application No. 60/070,594, Method and Apparatus for Determining the Position of a Player at a Sporting Event, filed Jan. 6, 1998.

BACKGROUND OF THE INVENTION

1. Field of the Invention

The present invention is directed to a system for determining the position of an object.

2. Description of the Related Art

The remarkable, often astonishing, physical skills and feats of great athletes draw millions of people every day to follow sports that range from the power of football to the grace of figure skating, from the speed of ice hockey to the precision of golf. Sports fans are captivated by the abilities of a basketball players to soar to the rafters, of a baseball pitcher to overwhelm the best hitters in the world, of a runner to explode down the track, etc. In televising these events, broadcasters have deployed a varied repertoire of technologies—ranging from slow-motion replay to lipstick-sized cameras mounted on helmets—to highlight for viewers these extraordinary talents. Not only are fans intrigued and excited by the efforts of athletes, their comparative abilities become topics of endless debate at water coolers, in sports bars, on the Internet, etc.

One piece of information that has never been available to fans of sports like basketball is the height that a player reaches in his or her vertical leap. Such information will not only create a statistic that reflects a critical athletic skill—jumping ability—but will also provide announcers with information that will enhance their analysis of the game. Subtle variations in different players' leaping ability, now verifiable, may explain rebounding strength or defensive domination. It will allow fans to see how great players without a spectacular leaping ability compensate with other strengths like positioning and timing. This information will be of tremendous interest to basketball fans, and to date there have been no successful attempts to provide such information during the telecast of a game.

Fans of other sports, like ski jumping, figure skating, and many more, will benefit from the information about leaping ability. It will quickly join other popular statistics like running speed and throwing distance in adding to viewers' appreciation of an athletic event.

Therefore, a system is needed that can determine the height that an athlete reaches in his or her vertical leap.

SUMMARY OF THE INVENTION

The present invention, roughly described, provides for a system for determining the vertical position of an object. The term object can include an inanimate object, a person (such as an athlete) or other living thing. In one embodiment the system determines the height that a basketball player jumped when dunking a basketball. The system determines the height of the jump and reports that height to one or more users. Reporting the height includes creating a graphic that conveys the height to a viewer and adding that graphic to a video segment or video stream showing the dunk. Reporting the height can also include providing the height information to other hardware or other software processes, saving the value to a file, returning the value from a software function call, displaying the information on a monitor, printing the information, providing the information on the Internet or any other means for conveying the information.

The system includes one or more sensors, a processor and at least one storage medium. In one embodiment, the sensors are video cameras. The video images from the cameras are received by the processor and stored in a loop buffer. When it is desired to determine the position of the object, one or more frames of video are selected, the object is identified in the frame(s) of video and the vertical position of the object is found. One embodiment utilizes two pairs of sensors. At any given time, one of the two pairs is selected for sending data to the processor.

The processor sends information regarding the vertical position of the object to a graphics generator, which creates a graphic conveying the vertical position of the object. The graphic generated by the graphics generator is sent to a video modification unit, which is in communication with a video replay unit. The video modification unit adds the graphic from the graphics generator to video from the replay unit and the resulting video can be used as part of a broadcast to viewers.

The system captures video images of the object using one or more sensors, determines one or more positions of the object in the captured images, and calculates the vertical position of the object based on the determined positions.

In one embodiment, the process of determining the vertical position of the object includes determining the three dimensional location of the object. The three dimensional location of the object includes a z coordinate. In some cases, the z coordinate represents height and is the desired vertical position. In other cases, the z coordinate or another aspect of the three dimensional location is used to determine the vertical position. For example, the height or size of the object may be subtracted from the z coordinate, the z coordinate can be transformed, or the z coordinate can be used with other geometric formulas for determining a vertical position.

Although the embodiment discussed below measures the jump height of a basketball player, the present invention may also be used to measure the vertical position of other objects, and at other live events or situations. For example, the system can be used to determine the height of a basketball rim, the height of a jump in volleyball, the height of a kicked or passed football, the height of a baseball, the height of a golf ball, the height of a high jumper, the height of a pole vaulter, the height of an object suspended above the ground, the height of a moving object, the height of a stationary object etc. The system can also be used for measuring the vertical position of objects not involved in sporting events. Additionally, because the system determines the three dimensional location of the object, the system can be used to determine information other than the vertical position. For example, the system can be used to determine the location of an object in order to determine distance such as the distance of a javelin or shotput throw or the distance of a jump. By determining the location of an object at multiple times, the system can determine velocity and/or acceleration.

These and other objects and advantages of the invention will appear more clearly from the following detailed description in which the preferred embodiment of the invention has been set forth in conjunction with the drawings.

BRIEF DESCRIPTION OF THE DRAWINGS

FIG. 1 is a drawing of a basketball court that depicts one example of suitable locations for the cameras used with the present invention.

FIG. 2 is a block diagram of one exemplar hardware system used to implement the present invention.

FIG. 5 is a flow chart illustrating the method for recording data.

FIG. 6 is a flow chart illustrating the method for determining a vertical position.

DETAILED DESCRIPTION

Figure 3A:
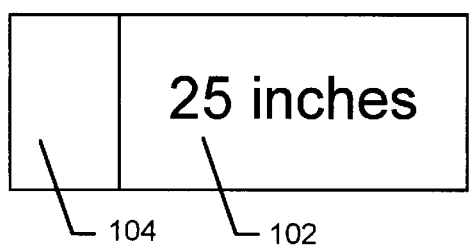
FIGS. 3A–3C illustrate sample graphics for reporting the vertical position of an object.

The present invention can be used in conjunction with many different events and situations, including sporting events and events other than sporting events. For illustrative purposes, the embodiment described below is used in conjunction with the broadcast of a basketball game.

FIG. 1 depicts a basketball court 10. Basketball court 10 includes a rim, net, backboard and support for the backboard (collectively called a "basket") at locations 14 and 16. The baskets at locations 14 and 16 are not shown in FIG. 1 for ease of illustration.

The present invention can be used with various types of sensors. For example, it is known in the art to track objects using video cameras, infrared sensors, ultraviolet sensors, x-ray sensors, radar sensors, ultrasound sensors, sonar sensors, etc. The particular embodiment disclosed below uses video cameras as sensors. The output of a video camera is a signal that represents a video image. Other sensors output different types of signals, many of which can represent an image. One example of a suitable video camera is the DXC-151A CCD Color Video Camera from Sony Corporation. The present invention is not limited to the particular Sony camera and any other suitable video camera can be used.

FIG. 1 shows four video cameras 20, 22, 24 and 26. Video cameras 20 and 22 are primary cameras. Video cameras 24 and 26 are secondary cameras. Video camera 20 is mounted at location 14 and is pointed toward the basket at location 16. Video camera 22 is mounted at location 16 and points toward the basket at location 20. In one embodiment, video cameras 20 and 22 are mounted approximately 12 feet off the floor, although other heights may also be suitable (e.g. 9 ft.). Video cameras 20 and 22 can be mounted on the support structure that holds the backboard (e.g. behind the backboard) or on a separate structure. Video cameras 20 and 22 are mounted parallel (or close to parallel) to the floor surface.

Camera 26 is mounted in the arena near the center line of the basketball court and points toward the basket at location 16. Camera 24 is also mounted in the arena near the center line of the basketball court; however, camera 24 points toward the basket at location 14. In one embodiment, cameras 24 and 26 are mounted at the same location as the main broadcast cameras for the television broadcaster. In another embodiment, cameras 24 and 26 can be located in areas other than near the center line, as long as the cameras can view the baskets. Cameras 22 and 24 are considered to be a left camera pair because both cameras point toward the basket at location 14 (on the left hand side of the court from the viewpoint of the main broadcast camera). Cameras 20 and 26 are considered to be a right camera pair because both cameras are pointing toward the basket at location 16 (on the right hand side of the court from the viewpoint of the main broadcast camera). FIG. 1 only shows one set of suitable sensor locations. Other locations for placing the sensors may also be used with the present invention.

FIG. 2 is a block diagram of one example of a hardware system used to implement the present invention. The components shown in FIG. 2 may reside in a truck in a parking lot outside an arena, in a video production room inside the arena or any other suitable location. A video switch 60 receives a video signal from each of the cameras shown in FIG. 1. Thus, video switch 60 receives a signal from camera 20, from camera 22, from camera 24 and camera 26. Video switch 60 chooses either the left camera pair or the right camera pair. That is, either the signal from camera 20 or from camera 22 will be passed on to signal 63, and the corresponding signal from either camera 24 or camera 26 will be passed to output signal 61. For example, when camera 20 is selected, camera 26 is also selected. If camera 22 is selected, camera 24 is also selected. Video switch 60 can switch the inputs on command from a computer, other hardware or a manual switch. In one embodiment, a human operator watching the game will choose either the left camera pair or the right camera pair based on the play of the game. If a player is about to dunk a basketball into the basket at location 16, the operator would choose the right camera pair. If a player is about to dunk a basketball into the basket at location 14, the operator would choose the left camera pair.

Computer 62 includes a processor, a memory, a disk drive, input devices and output devices (including a monitor). In one embodiment, computer 62 is an O2 Workstation from Silicon Graphics, Inc. Although the O2 is used in the embodiment of FIG. 2, various other computers and processors are also suitable for the present invention. Computer 62 includes an analog video input and digital video input. Line 63 is an analog video signal from video switch 60 to the analog video input of computer 62. The signal on line 61 is an analog video signal that is sent to analog to digital convertor 64. An example of a suitable analog to digital convertor is the ASD-251u NTSC/PAL to 4:2:2 Decoder from Miranda Technologies, Inc., Quebec, Canada; however, other converters may also be suitable for the present invention. The output of analog to digital convertor 64 is sent to video port interface 66. The output of video port interface 66 is sent to the digital input of computer 62. Video port interface 66 translates the digital video signal into a proprietary digital format suitable for input into computer 62. An example of a suitable video port interface includes the VIVO 4:2:2 Video Port Interface for the SGI O2 workstation, from Miranda Technologies, Inc. In an alternative embodiment, computer 62 will include two analog video inputs and, thus, there is no need for analog to digital convertor 64 or video port interface 66. In another embodiment, computer 62 will include two digital inputs, requiring both input signals to be converted to digital signals prior to computer 62.

Computer 62 also receives inputs from time code readers 68 and 70. Time code reader 68 receives its input from the master time code generator. Time code reader 70 receives its input from replay unit 72, which (in one embodiment) is a standard replay deck known in the art. The output of computer 62 is sent to graphics generator 74. Computer 62 determines the vertical position of the object of interest. Computer 62 sends the vertical position information to graphics generator 74, which creates a graphic for displaying the vertical position information. Graphics generator 74 can be any hardware and/or software that can generate a graphic based on input information. One example of a suitable graphics generator is a MAXINE! from Chyron Corporation. An alternative graphics generator could include a computer or other hardware/software that is capable of generating a graphic. The input to graphics generator 74 is ASCII text. The output of graphics generator 74 includes 2 signals 76 and 78, both of which are sent to a video modification unit 80. In one embodiment, computer 62 generates the graphic. In another embodiment, the system reports the vertical position information without creating a graphic.

Video modification unit 80 modifies the video signal received from replay unit 72 with a video signal (or graphic) sent by graphics generator 74. The type of modification can vary depending on the desired graphic. One embodiment utilizes a keyer as a video modification unit. When using a keyer, the signals from graphics generator 74 include a video signal 76 and an alpha (or key) signal 78. Video signal 76 is called foreground and the signal received from replay deck 72 is called background. Based on the level of key signal 78, the keyer determines how much of the foreground and background to mix to determine the output signal from 100% foreground and 0% background to 0% foreground and 100% background, on a pixel by pixel basis. In one alternative, the functions of video modification unit 80 can be performed by computer 62 or a separate computer. In another embodiment, the functions of video modification unit 80 can be performed by graphics generator 74. That is, the output of computer 62 and the output of replay deck 72 are sent to graphics generator 74, which creates a graphic for conveying the vertical position and adds that graphic to the video from replay deck 72.

As an option, the system can also include a data inserter for inserting non-video data into a television signal. Non-video data is information other than traditional data used by a television to draw the normal scan lines on a television display. An example of non-video data is information that is transmitted during the vertical blanking interval, which can be closed caption data, statistics, interactive queries or Internet addresses.

Figure 3B:
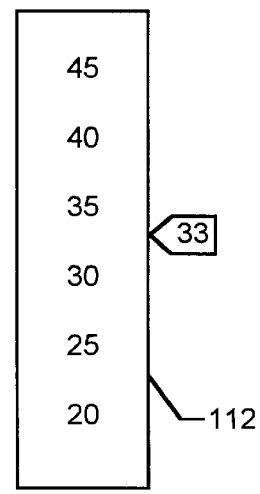
Figure 3C:
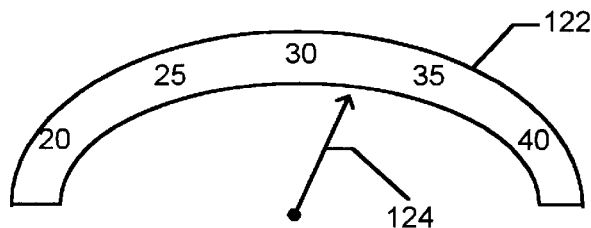

FIGS. 3A, 3B and 3C depict three examples of suitable graphics for use with the present invention. These graphics are shown for example purposes only and many other different graphics can used. The specific format of the graphic is not important to the present invention. FIG. 3A shows a rectangular graphic having 2 fields. Field 102 conveys the vertical position of the object and field 104 can be an advertisement or other information. FIG. 3B shows vertical bar 112 and pointer 114. Vertical bar 112 includes a preselected set of vertical position numbers. Pointer 114 is moved up and down vertical bar 112 until it points to the appropriate position on the vertical bar 112 representing the actual vertical position. Pointer 114 will also display the actual vertical position. FIG. 3C shows a semicircular bar 122 illustrating various preselected vertical position numbers. Arrow 124 points to the place on semicircular bar 122 that represents the actual vertical position. In one embodiment, the system add a window in the corner of the screen which shows the player jumping (e.g. at the top of his jump), a bar indicating the top of the player's head, an arrow from the floor to the bar and a numerical display of the magnitude of the vertical leap. Alternative graphics can also show the player's name, number, height and other statistics.

In operation, computer 62 will send information of the actual vertical position to graphics generator 74. Graphics generator 74 will create a graphic (one of the graphics of FIGS. 3A–3C or another graphic) and video modification unit 80 adds the graphic to the video signal from replay unit 72. In the embodiment disclosed in FIG. 2, the graphic conveying the height of a player's jump is added to a replay (e.g. instant replay). In another embodiment, the graphic can be stored for later use or added to live video by connecting video modification unit 80 to a live video feed (e.g. from a broadcast camera). In another embodiment, the vertical position can be reported to a commentator using a monitor, other display, printer, speaker, or other output device.

Figure 4:
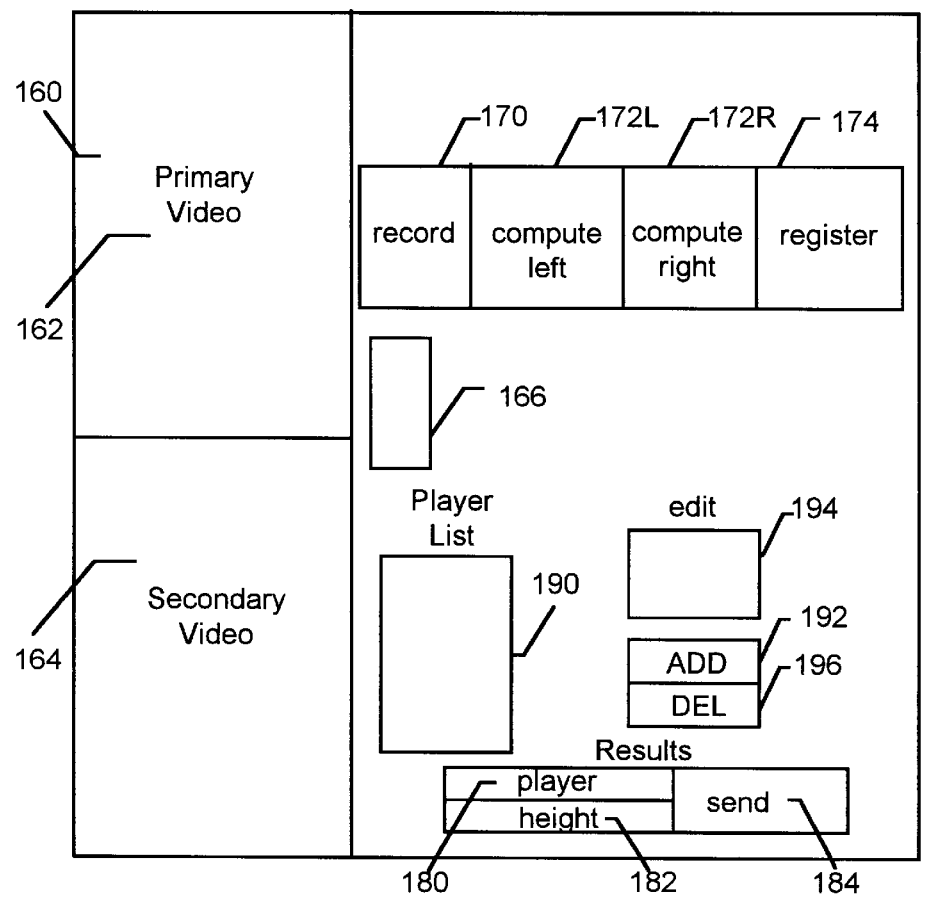
FIG. 4 illustrates an exemplar graphical user interface for the present invention.

Computer 62 includes a monitor and one or more input devices. Examples of suitable input devices include a keyboard and a pointing device (e.g. a mouse, pen, trackball, etc.). FIG. 4 depicts one example of suitable graphical user interface (GUI) 160 to be used in conjunction with the monitor and input devices of computer 62. GUI 160 includes a window 162 which displays the video signal from the selected primary camera that was sent on line 63 and stored in computer 62. Window 164 displays the video signal from the selected secondary camera which was received from video port interface 66 and stored by computer 62. GUI 160 also includes 4 buttons: record button 170, compute left button 172L, compute right button 172R and register button 174. Selecting record button 170 instructs the system to operate in record mode. Selecting compute left button 172L or compute right button 172R instructs the system to operate in compute mode. Selecting register button 174 instructs the system to operate in registration mode. Record mode, computer mode and registration mode are all discussed in more detail below.

In one embodiment, the system determines the three dimensional location of the top of a basketball player's head at the top of the player's jump. The system then subtracts the height of the player from the height of the top of the player's head to determine the height from the ground that the player jumped. The system displays the player's name in field 180 and the height of the player's jump in field 182 of GUI 160. The operator can view both values and, if satisfied, the operator can select send button 184 to send the height information to a queue. The height information sits in the queue until computer 62 receives the appropriate time code from replay deck 72, at which time it is sent to graphics generator 74. The appropriate time code is the time code corresponding to the frame of video used to determine the vertical position minus a user selected offset (e.g. three seconds). Field 166 on graphic user interface 160 is a slider that can be used to select the frame of video that is shown in fields 162 and 164 (synchronized using time codes) from those frames of video stored in computer 62. In one embodiment, the slider is in a vertical orientation, adjacent to fields 162 and 164, and is of a length that spans from the bottom of field 164 to the to of field 162. Rather than using graphical sliders, other software buttons, a shuttle or another hardware apparatus can be used to select the particular frame of video.

Because the system subtracts the height of the player from the height of the top of the players'head, the system must maintain a list of players and their heights. Player list 190 on GUI 160 lists all the players and their heights. A particular player can be selected from list 190 and deleted using DEL button 196. A new player can be added to list 190 by adding the new information into edit box 194 and selecting add button 192.

FIG. 5 is a flow chart illustrating the method for recording data after record button 170 of GUI 160 is selected. In step 250, the system captures video using the cameras discussed above. The video signals from the selected cameras are sent to computer 62. Video switch 60 can be switched between the left camera pair and the right camera pair. Thus, while the system is recording video, the source of that video (which camera captured the video) is also recorded. In step 252, the video is digitized. Video from the selected secondary camera is digitized using analog to digital convertor 64. The video signal from the selected primary camera is digitized in computer 62. The video information is eventually stored by computer 62 in RAM, on a disk or on another storage medium. In one embodiment, the video data is stored in a loop buffer. In step 254, the system determines whether the loop buffer is full. In one embodiment, the loop buffer can only hold 30 seconds of video for the primary camera and 30 seconds of video for the secondary camera. If the loop buffer is not full, the system stores the captured video (step 258). If the loop buffer is full, the system writes the new video over the oldest video data (step 256).

The O2 workstation in the system discussed above can not reliably store data in a suitable format at 30 frames per second, which is approximately the rate of output of the cameras noted above. Thus, every third frame is dropped so that the O2 stores only twenty frames per second. Each of the video signals selected by video switch 60 is compressed using JPEG compression prior to storage in the loop buffer. Additionally, the frames of video that are stored are time coded. The time code can be written for each frame or written once every n frames. The time codes can be stored in the data for the frames of video or in a separate data structure.

After step 256 or step 258, the system loops back to step 250 and more video is captured. Note that the steps of FIG. 5 are not necessarily performed in the order shown in FIG. 5. For example, the system is constantly capturing video and does not stop capturing video in order to perform steps 252–258. The method of FIG. 5 is continuously performed while the system is in record mode. When an operator selects either button 172 or 174, the system stops performing the steps of FIG. 5.

The primary and secondary video signals received by computer 62 are not completely symmetrical. That is, a signal sent by video switch 60 on line 61 is processed by analog to digital convertor 64 and video port interface 66; therefore, it takes longer for the video signal selected from the secondary camera to reach computer 62, as compared to the video signal from the selected primary camera. One method for figuring out the difference in timing of the two signals is to concurrently point the primary and secondary cameras at the same spinning wheel and note the number of frames that the two signals are out of synchronization. Once the difference in timing is known, computer 62 can compensate accordingly by aligning the appropriate frames of video. In one embodiment, computer 62 can be programmed to determine the difference in timing.

Other embodiments of the present invention may use groups of sensors other than pairs. For example, a camera pair can be replaced by a set of three or more sensors. Computer 62 should be able to store images for each sensor selected. Furthermore, some of the processing done by computer 62 can be performed by another processor local to one or more cameras. Another embodiment may use more than two groups of sensors and video switch 60 will be used to choose one of the groups.

When the operator of computer 62 selects compute left button 172L or compute right button 172R, the system is used to compute the vertical position of the object in question. Selecting compute left button 172L causes the system to utilize information for the left camera pair when computing the vertical position. Selecting compute right button 172R causes the system to utilize information for the right camera pair when computing the vertical position. FIG. 6 is a flow chart of one example of a method for determining a vertical position of the object. In step 300, a frame of video from the primary camera that is stored in computer 62 is identified for which the vertical position will be calculated from. When the system is determining the height of a basketball player's jump, the frame of video identified should be the frame where the player is at the top of his or her jump. In one embodiment, the operator uses slider 166 to shuttle between all the frames of video stored for the primary camera. As the operator is moving slider 166, the different frames are appearing in window 162. The operator shuttles between the frames until the operator sees the player at the top of his or her jump. At that point, the operator stops and has identified the frame to be used for the computation. In an alternative embodiment, the system can include pattern recognition software to find the player jumping and determine when the player has reached the top of the player's jump and/or identify an appropriate frame of video.

After identifying the frame where the player is at the top of his or her jump the, the position of the object in the identified frame of video is determined in step 302. In one embodiment, the operator uses a pointing device (e.g. a mouse), in window 162, to point to the top of the player's head. In other embodiments, the operator can point to other parts of the object. An alternative can include using pattern recognition software to perform this step automatically.

In step 304, the position of the object in the frame of video for the secondary camera is determined. Because each frame of video is time coded, when the frame from the primary camera is selected in step 300 a corresponding frame from the secondary camera can be selected by the computer 62 automatically and displayed in window 164. In an alternative embodiment, a frame of video can be identified for the secondary camera in the same manner that step 300 is performed. After identifying the frame of video for the secondary camera, the operator uses the pointing device to select the top of the player's head in the identified frame of video from the secondary camera.

In one alternative, the system can determine a line of position from the primary video camera to the point selected by the operator in step 302 and then display that line in window 164. Computer 62 can restrict the operator such that the operator can only select a position in window 164 that is on the displayed line. In another alternative, step 304 can be performed automatically using pattern recognition software.

After selecting the positions in both the primary and secondary frames of video, the system determines a vector from the primary camera to the object (step 306). This vector is also called a line of position and runs from the camera through the object. In one embodiment, the vector is determined by using a pixel map.

In one embodiment, each of the cameras 20, 22, 24 and 26 utilizes one or more charge coupled devices (CCD). The CCD, the sensing element of the camera, is broken up into a number of pixels. Prior to operation of the system of FIG. 2, the system is loaded with a pixel map for each sensor. The pixel map is a set of data or a set of equations which can be used to determine a vector in a camera based coordinate system, for any pixel (or sub-pixel) on the CCD. The camera based coordinate system is defined by locating the origin at the front nodal point of the camera lens. The X axis, Y axis and Z axis are defined as follows: when standing behind the camera and looking in the same direction the camera is pointed, the X-axis points to the right, the Y-axis points up and the Z-axis points straight back through the camera itself. Each axis is perpendicular to the other two. The vectors defined by the pixel map originate from the nodal point.

Figure 7:
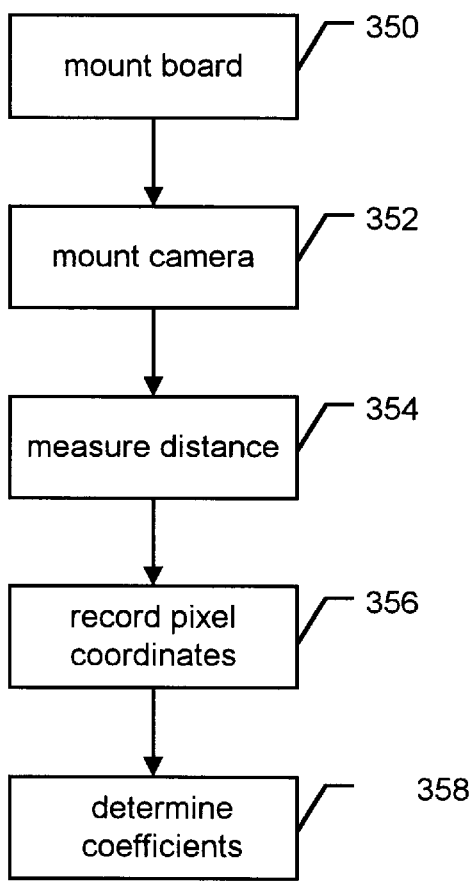
FIG. 7 is a flow chart illustrating the method for camera mapping.

Several methods are suitable to produce such a map and several different types of pixel maps can be used with the present invention. The example method described by the flow chart of FIG. 7 produces a surface defined by a pair of equations. In step 350, a target board with a grid of points is mounted on a wall or other support structure. Each point in the grid is four inches from its neighbor. In step 352, the camera (or other sensor) is mounted and aimed at the target board. The camera should be mounted such that the board fills the camera's field of view, the camera's optical axis is perpendicular to the target board and the camera's optical axis passes through the center point of the board. The camera is also aligned such that the camera's CCDs are parallel, to the extent possible, to the board. In step 354, the distance from the camera's front nodal point to the target board is measured. The camera's output is sent to a computer with a monitor and a pointing device. In step 356, a user points (using the pointing device) on the monitor to each point on the target board. For each point, the computer stores the pixel coordinates and real vector. The real vector is the actual vector from the camera to the point on the board, which can be determined by direct measurement. The real vector, expressed in the camera's coordinate system, has the X coordinate equal to the horizontal distance the point is from center of the board, the Y coordinate equal to the vertical distance the point is from the center of the board and the Z coordinate equal to the negative of the distance from the camera's front nodal point to the center of the board. After data for each point (or a sufficient number of points) is stored, the set of pixel coordinates and vectors are used to determine the coefficients (step 358) for the following equations:

$$real.x = A1*ccd.x + B1*ccd.y + C1*ccd.x*ccd.x + D1*ccd.y*ccd.y + E1*ccd.x*ccd.y + F1*ccd.rad2 + G1*ccd.rad4 + H1$$

$$real.y = A2*ccd.x + B2*ccd.y + C2*ccd.x*ccd.x + D2*ccd.y*ccd.y + E2*ccd.x*ccd.y + F2*ccd.rad2 + G2*ccd.rad4 + H2$$

real.z = −(measured distance to target board)

where:
real.x and real.y are the x and y values of the real vectors;
ccd.x is the x coordinate of the pixel for the point on the board associated with the particular real vector;
ccd.y is the y coordinate of the pixel for the point on the board associated with the particular real vector;
the coefficients A1 through H1 and A2 through H2 are determined by minimizing the sum of the squared errors, where each error is the difference between the value for real.x, real.y or real.z computed with the equations above and the corresponding known coordinates for each point on the board. One embodiment computes the values of the coefficients using multiple linear regression, for example, using the LINEST function in Excel by Microsoft Corporation;

ccd.rad is the "pixel radius", or radius from the center of the CCD array to the pixel of interest;
ccd.rad2 is the square of ccd.rad; and
ccd.rad4 is the fourth power of ccd.rad.
The variable ccd.rad is computed as follows:

$$dx = ccd.x - pix.centerx$$

$$dy = ccd.y - pix.centery$$

$$ccd.rad = \sqrt{(dx*dx + dy*dy)}$$

where:
pix.centerx is the x coordinate of the center of the CCD (in pixels)
pix.centery is the y coordinate of the center of the CCD (in pixels)

Looking back at FIG. 6, step 306 includes using the x and y coordinates of the pixel pointed to by the user in step 302 as ccd.x and ccd.y in the equations for real.x and real.y. Once the real vector is computed with the above equations it is normalized to unit length as follows:

$$length = \sqrt{(real.x*real.x + real.y*real.y + real.z*real.z)}$$

$$normalized\text{-}real.x = real.x/length$$

$$normalized\text{-}real.y = real.y/length$$

$$normalized\text{-}real.z = real.z/length$$

The vector normalized-real is then used in future steps of the method described in FIG. 6.

In step 308 the vector for the secondary camera is determined in the same manner used for step 306. That is, the x and y coordinates for the pixel selected in step 304 are plugged into the equation to determine real.x and real.y. The real vector is then normalized. At this point, the system now has two vectors (in respective camera coordinate systems), one vector represents a straight line from the primary camera through the top of the player's head and the second vector represents a straight line from the secondary camera through the top of the player's head.

In step 310, both vectors are transformed from respective camera based coordinate systems to an arena based coordinate system. When discussing the camera mapping above, a coordinate system was set up for each camera. Each camera will have its own coordinate system, thus, the vectors from the different cameras are incompatible with each other. To make the vectors compatible they must be transformed to the same coordinate system. Therefore, a new coordinate system is set up called the arena coordinate system. In one embodiment, the arena coordinate system is set by placing the origin in the corner of the basketball court. Looking back at FIG. 1, point 30 indicates the origin. The positive X axis is along the out-of-bounds lines 34. The positive Y axis is along out-of-bounds line 32. The positive Z axis comes straight up from the court and is perpendicular to both the X axis and Y axis. Other definitions of an arena coordinate system may also be used.

There are many suitable ways for transforming a vector from each of the different camera coordinate systems to the single arena coordinate system. Any suitable technique known in the art is acceptable for the present invention. One technique used is to multiply the vectors in the camera coordinate systems by a transformation matrix. One example of a transformation matrix is a direction-cosine matrix. The direction-cosine matrix is a 3×3 matrix which defines one coordinate system relative to another. The direction-cosine matrix includes information about the orientation of the sensor. Orientation includes information about pan, tilt and roll. Registration parameters are defined to include orientation information, location information, zoom information, lens distortion, other parameters that describe the physics of the sensor, and/or a subset of the above listed information. Thus, in one embodiment, step 310 includes computer 62 multiplying the vectors found in steps 306 and 308 by their respective direction-cosine matrices. The direction-cosine matrix is discussed in more detail below. Other methods of transforming the vectors can also be used with the present invention.

After step 310 is completed, the system has two vectors in the same coordinate system. Each vector starts from its respective camera and travels through the object. In an ideal world, the two vectors would intersect at the object. However, due to real world limitations, the two vectors are not likely to actually intersect. Thus, in step 312 computer 162 determines the point of closest approach. In one sense, the point of closest approach can be thought of as the point where the two vectors are the closest to each other. Since the two vectors do not intersect, there will be a point of closest approach for each vector. Computer 62 will use the point of closest approach along the vector from the primary camera. The point of closest approach is found on the vector from the primary camera as follows:

$$pnt1.x = pt1.x + s*vec1.x$$

$$pnt1.y = pt1.y + s*vec1.y$$

$$pnt1.z = pt1.z + s*vec1.z$$

where:
  pnt1 is the point (pnt1.x, pnt1.y, pnt1.z) of closest approach on the vector emanating from the primary camera;
  pt1 is the location (py1.x, pt1.y, pt1.z) of the primary camera itself (and thus the origin of the vector from the primary camera);
  s is the distance along the vector emanating from the primary camera to the point of closest approach;
  vec1 is the vector (expressed in arena coordinates) from the primary camera transformed in step 310;
Matrix A is a 3×3 matrix whose rows are diff__1__2, vec2, and cross__12. The variable s is computed by taking the determinant of the matrix A divided by the dot product of cross__12 with itself,
where:
  diff__1__2 is the vector obtained by subtracting vec1 from vec2;
  vec2 is the vector (expressed in arena coordinates) from the secondary camera transformed in step 310; and
  cross__12 is the vector obtained by taking the cross product of vec1 with vec2.

In step 314, computer 62 determines the vertical position of the object. The point of closest approach determined in step 312 represents the three dimensional location of the top of the player's head at the peak of his or her jump. The three dimensional location includes an x coordinate, a y coordinate and a z coordinate. The z coordinate, pnt1.z, is the vertical position of the top of the players head in relation to the surface of the floor. Computer 62 subtracts the player's height from pnt1.z to determine the height of the players jump, which in the present example is the desired vertical position of the object. Thus, if the top of the players head is 9 feet from the floor and the player is 6 feet, 6 inches tall, then the height of the players jump is 30 inches. Computer 62 transmits the height of the jump (one example of vertical position data) to graphics generator 74. In step 316, graphics generator 74 generates a graphic, as discussed above. In step 318, video modification unit 80 adds the generated graphic to the video from replay unit 72. The video with the graphic can then be recorded or broadcast.

In operation, the system will be in record mode most of the game. When a producer (or someone else) sees a slam dunk (or other play) for which the producer would like the height of the player jumping, the operator will put the system in compute mode and computer 62 will compute the height of the player's jump. The graphic displaying the height of the player's jump can be inserted into live video (rather than from a replay unit) or the broadcaster can choose to add the graphic to an instant replay (from replay unit 72) of the dunk.

Registration is a process of defining how to interpret data from a sensor (a camera being one type of sensor). The sensors described above output data, for example, which is used to determine position or location. Since position or location is relative, the system needs a reference from which to interpret the data and determine position or location. One example of how to interpret the data from different sensors is to use the direction-cosine matrices described above. When using direction-cosine matrices, defining how to interpret data includes determining the direction-cosine matrices for each sensor.

Figure 8:
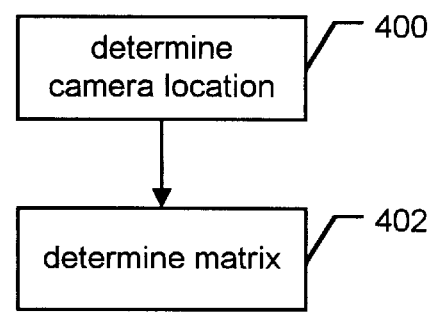
FIG. 8 is a flow chart illustrating the method of registering a camera.

FIG. 8 is a flow chart illustrating the steps of registering a camera (or other sensor) for the present invention. The steps of FIG. 8 should be performed prior to using the system in record mode or compute mode. In step 400, the location of the camera is determined. In step 402, the location of the camera is used to determine the direction-cosine matrix for each camera. Each of these steps will be discussed in more detail below.

Figure 9A:
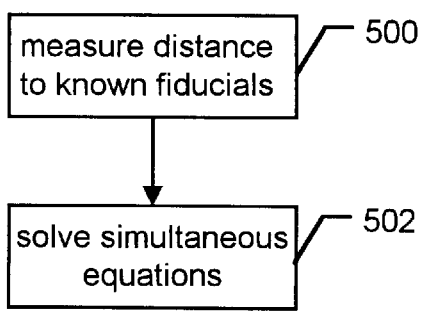
FIG. 9A is a flow chart illustrating a first method for determining the location of a camera.

FIG. 9A is a flow chart illustrating a first method for determining the location of a camera (step 400 in FIG. 8). Step 500 includes measuring the distance from the camera to three known fiducials. A fiducial is a reference mark and a known fiducial is a reference mark whose location is known. One method for measuring these distances is to use a laser range finder. Alternatively, a tape measure can be used. To simplify the process, all of the fiducials should be on the floor (e.g. z=0 plane). In one embodiment, fiducials off the floor are used (e.g. on the backboard). Step 502 includes solving for the following 3 equations:

$$pos.x = x + vec1.x$$

$$pos.y = y + vec1.y$$

$$pos.z = z + vec1.z$$

Figure 9B:
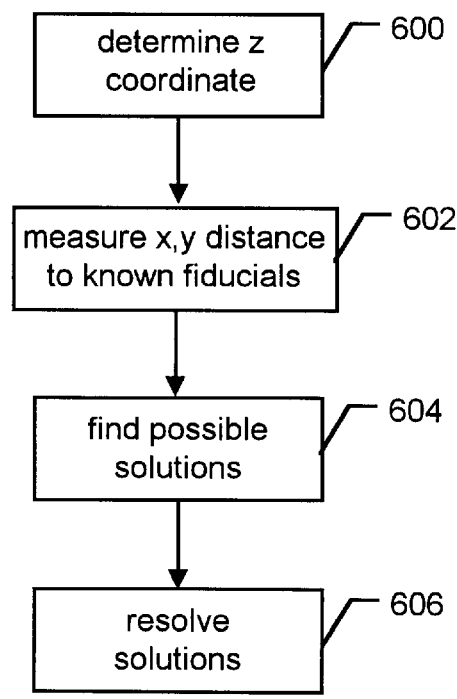
FIG. 9B is a flow chart illustrating a second method for determining the location of a camera.

The coordinates (pos.x, pos.y and pos.z ) is the position of the sensor we're solving for. Vec1 is coordinates of the first fiducial expressed in arena coordinates. Note that vec1 includes three coordinates (vec1.x, vec1.y, vec1.z). Similarly, vec2 and vec3 give the coordinates of the 2nd and 3rd fiducials, respectively, in arena coordinates. The values of x, y, & z are obtained as follows:
(1) $z = \sqrt{(d1sq - x*x - y*y)}$
(2) $x = (y2*(d1sq - d3sq + x3*x3 + y3*y3) - y3*(d1sq - d2sq + x2*x2 + y2*y2))/denom$
(3) if the absolute value of y3 is greater than the absolute value of y2, then: $y = (d1sq - d3sq - 2.0*x*x3 + x3*x3 + y3*y3)/(2*y3)$ Otherwise: $y = (d1sq - d2sq - 2.0*x*x2 + x2*x2 + y2*y2)/(2*y2)$ where:
d1sq, d2sq and d3 sq are the squares of the measured distances from the camera position to the first fiducial, the second fiducial and the third fiducial, respectively,
denom=2*(x3*y2−x2*y3)
x2=vec2.x−vec1.x
y2=vec2.y−vec1.y
x3=vec3.x−vec1.x
y3=vec3.y−vec1.y FIG. 9B is a flow chart of a second method for determining the location of a camera. Step 600 includes determining the height of the camera. This can be accomplished by measuring the height of the camera directly using a tape measure or a laser range finder. Step 602 includes measuring the x and y distances to a set of two known fiducials. One embodiment of performing step 602 includes measuring the distance from a point directly below the camera to two known fiducials on the court surface. To determine the point directly below the camera, a plumb bob can be hung from the camera and stickers placed on the court below the plumb bob. Using a laser range finder, tape measure or any other suitable method, the distance from the sticker to the two known fiducials can be measured. In step 604, the following equations are used to find two possible solutions (xa, ya) and (xb, yb) for the location of the camera:

xa=x1+*dist*1*cos(alpha2+alpha1)

ya=y1+*dist*1*sin(alpha2+alpha1)

xb=x1+*dist*1*cos(alpha2−alpha1)

yb=y1+*dist*1*sin(alpha2−alpha1)

where:
(xa, ya) and (xb, yb) represent the two possible solutions.
(x1, y1) are the coordinates of the first known fiducial
(x2, y2) are the coordinates of the second known fiducial
dist1 is the measured distance from the sticker below the camera to the first fiducial
dist2 is the measured distance from the sticker below the camera to the second fiducial
alpha1=arc-cosine((dist1*dist1−dist2*dist2+d*d)/(2.0*dist1*d))
alpha2=arc-tangent2(dy, dx)
d=√(dx*dx+dy*dy)
dx=x2−x1
dy=y2−y1

As discussed above, two possible solutions (xa, ya) and (xb, yb) are found. One of these solutions represents the actual two dimensional location of the point directly below the camera and the other solution is its mirror image. One method for determining which of the two valid solutions is the actual location is by using computer 62 (or another computer) to draw a three dimension rendition of the basketball court and plot both points. One of the points will be in an expected location and the other point will be in a location that does not make sense. The operator can manually choose the correct point for the system. Another method to determine which is the correct point is to perform the method with one of the two fiducials already used and one new fiducial. The second iteration should produce two possible solutions, one of which will be the same as either (xa,ya) or (xb,yb). That solution which is the same as either (xa,ya) or (xb,yb) is the actual solution.

Step 402 of FIG. 8 includes determining the direction-cosine matrix for a camera. The direction-cosine matrix represents(or embodies) the orientation of the camera. In one embodiment, the direction-cosine matrix is determined by first determining two temporary matrices. The first temporary matrix transforms a vector from a camera coordinate system to a temporary coordinate system. The second matrix converts the vector from the temporary coordinate system into the arena coordinate system. The two matrices can be reduced to a single matrix by multiplying the two matrixes together to form a single 3×3 matrix. Thus, the direction-cosine matrix is computed using the following equation:

dc_sc=dc_tc*dc_st where:
dc_sc is the 3×3 direction-cosine matrix which converts a vector in the camera coordinate system into the same vector expressed in the arena coordinate system;
dc_tc is the 3×3 which converts a vector in the temporary coordinate system into the same vector expressed in arena coordinate system; and
dc_st is the 3×3 matrix which converts a vector in the camera coordinate system into the same vector expressed in the temporary coordinate system.

The matrix dc_tc is defined as:

$$\begin{pmatrix} vectA.x & vectB.x & vectC.x \\ vectA.y & vectB.y & vectC.y \\ vectA.z & vectB.z & vectC.z \end{pmatrix}$$

where:
vectA=fiducial-1−camera.pos (normalized);
vectD=fiducial-2−camera.pos;
vectC=cross-product of vectA with vectD (normalized),
vectB=cross-product of vectC with vectA;
camera.pos is the three dimensional location of the camera in the arena coordinate system; and
fiducial-1 and fiducial-2 are the three-dimensional coordinates of the two known fiducials in the arena coordinate system.

The matrix dc_st is defined as:

$$\begin{pmatrix} vectF.x & vectF.y & vectF.z \\ vectG.x & vectG.y & vectG.z \\ vectH.x & vectH.y & vect.Hz \end{pmatrix}$$

where:
vectF is the normalized vector, in the camera coordinate system, corresponding to the pixel position of fiducial-1 in the camera's field of view obtained from the pixel map described above;
vectK is the normalized vector, in the camera coordinate system, corresponding to the pixel position of fiducial-2 in the camera's field of view, obtained from the pixel map described above;
vectH is the cross-product of vectF with vectK (normalized); and
vectG is the cross-product of vectH with vectF.

It is advantageous to survey several pairs of fiducials in the camera's field of view, perform the above described computations for each pair of coordinates and average the results. It would also be a simple matter to employ a multivariate optimizer in order to minimize total error.

To improve accuracy of the system, it is advantageous to adjust the registration parameters to minimize the total error objective function. The total error objective function is defined as a function of the differences between the calculated vertical positions of a set of fiducials and the actual known vertical positions. A typical objective function is the sum of squares of the errors. The registration parameters subject to adjustment are the camera locations, a breathing factor for each camera and orientation for each camera. The breathing factor is a scale factor corresponding to focus applied to camera focal length. Many methods for accomplishing such optimization are known. One that is related to the method used in the current invention is Tsai's Camera Calibration. For more information, see "A Versatile Camera Calibration Technique for High-Accuracy 3D Machine Vision Metrology Using Off-the-Shelf TV Cameras and Lenses," Roger T. Tsai, IEEE Journal of Robotics and Automation, Vol. RA-3, No.4, August 1987, pages 323–344). The method used in the present invention differs from Tsai's by using the breathing factor instead of adjusting focal length and the current method independently models the sensor rather than including the coefficients to be adjusted. It can be advantageous to independently model the lens, because a more controlled environment with more data points may be available in the laboratory.

Figure 10:
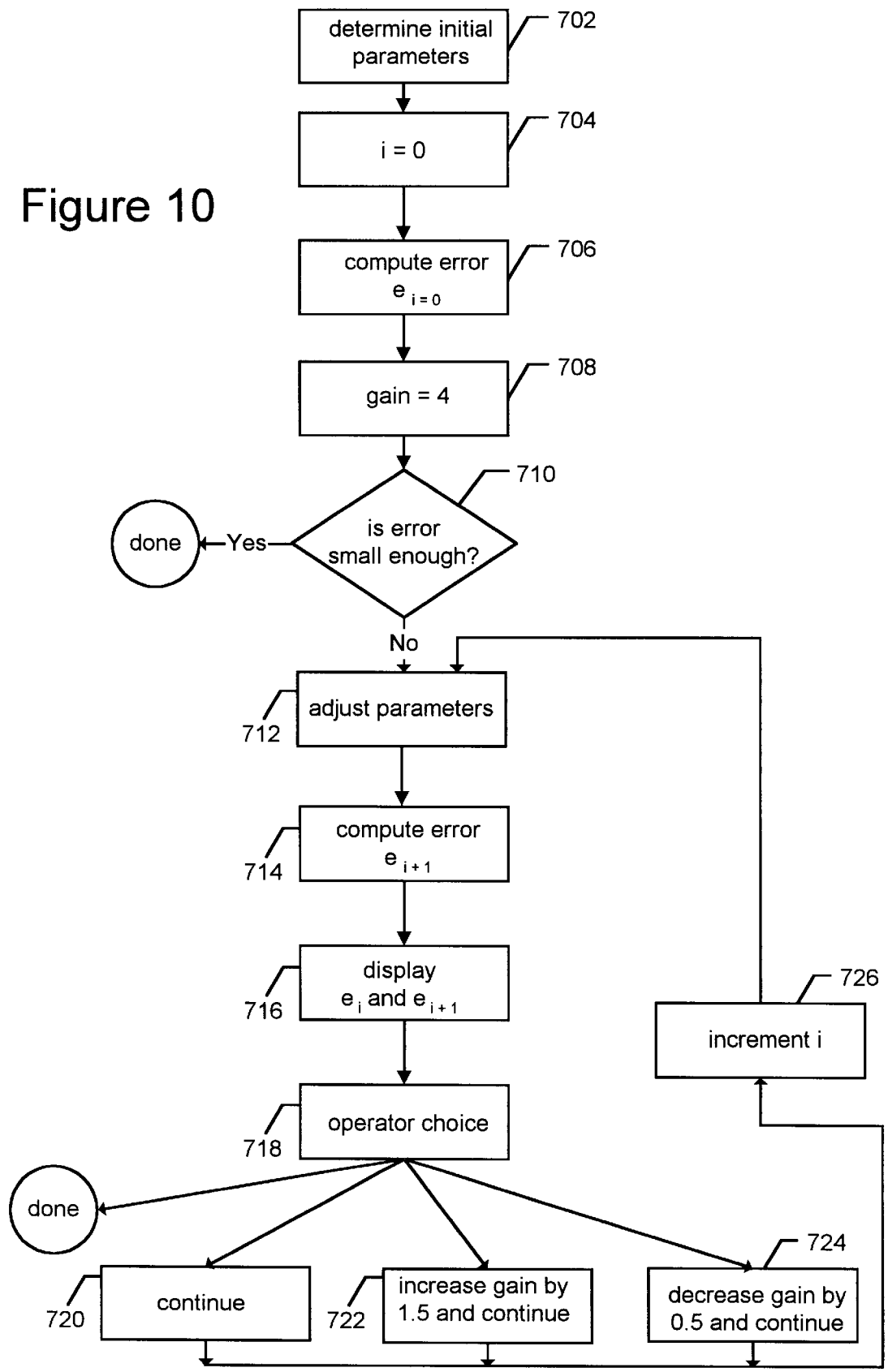
FIG. 10 is a flow chart illustrating a method for minimizing registration error.

FIG. 10 is a flow chart which explains one method of adjusting system parameters to minimize error. Step 702 comprises determining the initial parameters, which includes any or all of the methods described above for determining a pair (left pair or right pair) of camera locations, lens maps and direction cosine matrices. In step 704, a counting index (i) is initialized to zero. In step 706, the error is computes using the initial parameters. The error is computed in step 706 is labeled as $e_i$, where i=0. The error is determined by using the system to calculate the height of each known fiducial, comparing those heights to the known actual heights and calculating the total error objective function. In step 708 the gain is initially set to four (other initial values can also be used).

If the error calculated in step 706 is small enough (step 710) then the method of FIG. 10 is done. In one embodiment, the error is small enough if all calculated heights are within ¾ of an inch of actual heights. If the error is not small enough, the parameters are adjusted in step 712. The location parameters are adjusted by adding to or subtracting from the parameter the product of the gain multiplied by a preset increment. For example, preset increment for the the position coordinates can be 0.01 meters. The breathing factor is adjusted by adding to or subtracting from real.z the product of the gain multiplied by a preset increment. The preset increment for the breathing factor can be 0.01 meters. The orientation is adjusted by multiplying the direction-cosine matrix by another matrix or (matrices) that represent(s) an adjustment in pan, tilt and/or roll, the adjustment being equal to the product of the gain multiplied by a preset increment. The preset increment for the orientation can be 0.01 degree changes in pan, tilt and roll.

In step 714, the total error objective function is recalculated using the newly adjusted parameters. This newly calculated error ($e_{i+1}$) and the previously calculated error ($e_i$) are displayed to an operator in step 716. The operator has four choices based on comparing $e_{i+1}$ to $e_i$: end the process, continue (step 720), increase the gain by 1.5 and continue (step 722), or decrease the gain by 0.5 and continue (step 724). If $e_{i+1}$ is small enough or the operator does not believe it would be efficient to continue, then the operator should choose (but is not required) to end the method of FIG. 10. Otherwise, the operator has to make a judgement based on experience whether to choose steps 720, 722 or 724. After steps 720, 722 or 724, the system increments the index i in step 726 and loops back to step 712.

The above described system requires a least two sensors to determine the vertical position of an object. That is, the system can function with only one camera pair. An alternative embodiment can determine a vertical position with only one sensor. Looking at FIG. 1, the system can be set up with either sensor 20, sensor 22 or both. If the system has both sensors, only one sensor is selected at any given time (depending on which side the basketball is on). Using one sensor, the system can determine a vector from the sensor to the top of the players head. Because there is not a second vector to resolve where along the first vector the object actually is, the system can make an estimate of that point. That is, it can be assumed that all dunks are performed utilizing a jump that peaks at approximately 5 feet from the basket. Although in practice jumps vary from that estimate, the difference in various jumps may not materially affect the accuracy of the computations. If it is assumed that the jumps reach the top height 5 feet before the basket and the distance from the sensor to the basket is known, the system also knows the distance from the sensor to the estimated top of the jump. The system can determine the point on the vector which is the appropriate distance from the sensor and use the point as the point of closest approach. The system would still perform the steps of 300, 302, 306 and 310. Steps 304 and 308 would be skipped. Step 312 will be performed by finding the point along the vector that is 5 feet from the basket. Steps 314–318 would be performed as discussed above. In another alternative, the system can use one camera which has a variable zoom lens. The variable zoom lens has at least two settings, one for when the ball is in the far court and one for when the ball is in the near court.

Another embodiment of the present invention includes two cameras and two video tape machines. The video does not need to be digitized. The operator can use the forward and reverse controls on the video tape machine to find the frame where the player is at the top of the player's jump. The images from the video tape player can be displayed on a television monitor. The operator can measure, using a ruler or other device, the position of the player's head on the monitor's screen. That measured position can be used to determine the height of the jump with or without using a computer. In one alternative, the video tape machine can be eliminated by having the operator watch the game on a television monitor and when a player jumps, the operator simply places his/her finger (or other pointing device) on the location of the top of the player's head at the top of the jump.

One method for calculating the height of a jump based on a location on a monitor's screen or based on pixel coordinates is to use a look up table. The input to the look up table can be the x and y coordinates from one or more of the cameras and the output of the look up table can be a three dimensional location or a vertical position. One way to create such a look up table is to use a set of poles. Each pole being at a different, but known, height. The poles are placed in and moved around the field of view for each camera. The pixels or screen position are recorded for each pole and used to create the map. For pixels or positions that do not correspond to a pole, the system can interpolate.

In another embodiment, the system can determined the hang time for a jump based on the time code stored with the video images. Hang time can be defined as the time an object is airborne, the time an object is within a percentage of the peak of its trajectory, or another appropriate time. A user would select the frame of video to start the hang time computation and a frame of video to end the hang time computation. By looking at the difference between the time codes for both frames, the system can determine the hang time.

Rather than add a graphic to a replay, the system can be used to add a graphic to the live video after the jump. One example of a graphic is to add a window to the corner of the screen which shows the player jumping. The image could be from a broadcast camera or it can be the selected frame(s) from either the primary camera or secondary camera discussed above. The system would add a graphic to the image of the player jumping which indicates the height of the jump.

The present invention can be used with NTSC, PAL, SECAM, SDTV, DTV, HDTV or other video formats.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for determining a vertical position of an object, comprising the steps of:
   receiving a first video image from a first camera and a second video image from a second camera;
   determining a first position of said object in said first video image and a second position of said object in said second video image;
   determining said vertical position of said object, said step of determining said vertical position includes finding a location at or near a point of closest approach between a first vector and a second vector, said first vector corresponds to said first position and said second vector corresponds to said second position; and
   reporting said vertical position.

2. A method according to claim 1, wherein:
   said object is a basketball player;
   said vertical position is a height of a jump of said basketball player;
   said first position, said second position and said location correspond to a top of said basketball player's head; and
   said step of determining said vertical position includes subtracting said basketball player's height from a vertical component of said location.

3. A method according to claim 1, wherein:
   said step of determining said vertical position further includes the steps of transforming said first vector from a first coordinate system to a second coordinate system and transforming said second vector from a third coordinate system to said second coordinate system, said location is in said second coordinate system.

4. A method according to claim 1, wherein:
   said step of determining a first position includes pointing to said first position and said second position using a pointing device.

5. A method according to claim 1, wherein:
   said step of reporting includes creating a graphic conveying said vertical position and adding said graphic to a video signal.

6. A method according to claim 1, further including the step of:
   mapping said first camera and said second camera.

7. A method according to claim 1, wherein:
   said step of determining said vertical position uses registration parameters for said first camera and said second camera.

8. A method according to claim 1, wherein:
   said step of determining said vertical position includes:
   transforming said first vector from a first coordinate system to a second coordinate system.

9. A method according to claim 1, wherein:
   said object is a player; and
   said step of determining said vertical position further includes subtracting said player's height from a vertical component of said location.

10. A method according to claim 1, wherein:
    said step of receiving includes receiving a first set of video images from said first sensor and a second set of video images from said second sensor, said first set of video images includes said first video image, said second set of video images includes said second video image.

11. A method according to claim 10, wherein said step of determining a first position and a second position includes the steps of:
    finding a first frame of video in said first set of images depicting said object at said vertical position;
    finding a second frame of video in said second set of images depicting said object at said vertical position;
    finding said first position of said object in said first frame; and
    finding said second position of said object in said second frame.

12. A method according to claim 11, wherein said step of determining said vertical position includes:
    transforming said first vector from a first coordinate system to a second coordinate system and transforming said second vector from a third coordinate system to said second coordinate system, said location is in said second coordinate system.

13. A method for determining a vertical position of an object, comprising the steps of:
    receiving and storing a first set of images from a first camera;
    providing on-demand visual access to said stored first set of images;
    finding a first image of said first set of images that depicts said object at said vertical position;
    determining a first position of said object in said first image;
    determining said vertical position of said object based on said first position in said first image; and
    reporting said vertical position.

14. A method according to claim 13, further including the steps of:
    receiving and storing a second set of images from a second camera;
    finding a second image of said second set of images that depicts said object at said vertical position; and
    determining a second position of said object in said second image, said step of determining said vertical position is based on said first position and said second position.

15. A method according to claim 14, wherein said step of determining said vertical position includes the steps of:

transforming a first vector corresponding to said first position from a first coordinate system to a second coordinate system and transforming a second vector corresponding to said second position from a third coordinate system to said second coordinate system; and finding a point of closest approach between said transformed vectors.

16. A method for determining a vertical position of an object, comprising the steps of:

receiving a first image from a first camera;

determining a first position in said first image corresponding to said object at said vertical position, said step of determining a first position includes pointing to said first position using a pointing device;

determining said vertical position based on said first position; and reporting said vertical position.

17. A method according to claim 16, further including the steps of:

receiving a second image from a second camera; and determining a second position in said second image corresponding to said object, said step of determining a second position includes pointing to said second position using a pointing device, said step of determining said vertical position is based on said first position and said second position.

18. A method according to claim 17, wherein:

said step of determining a said vertical position includes the steps of:

transforming a first vector corresponding to said first position from a first coordinate system to a second coordinate system and transforming a second vector corresponding to said second position from a third coordinate system to said second coordinate system, and finding a point of closest contact between said transformed vectors.

19. A method according to claim 17, wherein:

said step of determining a second position in said second image includes drawing a line in said second image, said second position being on said line, said step of drawing a line is performed after determining said first position and prior to determining said second position, said line is based on said first position.

20. An apparatus for determining a vertical position of an object, comprising:

one or more sensors, said sensors capture images;

a processor in communication with said one or more sensors;

a storage medium in communication with said processor, said storage medium storing code for programming said processor to perform a method of determining the vertical position of the object, the method comprising the steps of:

receiving a first set of images from a first sensor, receiving an indication of a first image of said first set of images that depicts said object at said vertical position, receiving an indication of a first position of said object in said first image, determining said vertical position of said object based on said first position, and reporting said vertical position.

21. An apparatus according to claim 20, further including:

a video switch including one or more inputs and one or more outputs, said inputs connected to said one or more sensors, said one or more outputs in communication with said processor.

22. An apparatus according to claim 20, further including:

a time code reader in communication with said processor, said time code reader receiving a time code signal.

23. An apparatus according to claim 21, further including:

a graphics generator in communication with said processor;

a replay unit for supplying replay video; and a video modification unit in communication with said replay unit, said graphics generator and said processor in order to add a graphic to said replay video that reports said vertical position.

24. An apparatus according to claim 20, wherein said method further includes the steps of:

receiving a second set of images from a second video camera;

finding a second image of said second set of images that depicts said object at said vertical position; and determining a second position of said object in said second image, said step of determining said vertical position is based on said first position and said second position.

25. An apparatus according to claim 24, wherein said step of determining said vertical position includes the steps of:

transforming a first vector corresponding to said first position from a first coordinate system to a second coordinate system and transforming a second vector corresponding to said second position from a third coordinate system to said second coordinate system; and finding a point of closest approach between said transformed vectors.

26. An apparatus according to claim 23, wherein:

said one or more cameras includes a first set of cameras and a second set of cameras;

said first set of cameras pointed at a first area;

said second set of cameras pointed at a second area; and said video switch is connected to said first set of cameras and said second set of cameras, said video switch is capable of switching between said first set of cameras and said second set of cameras.

27. An apparatus according to claim 20, wherein:

said object is a basketball player; and said vertical position is a height of a jump of said basketball player.

28. A method according to claim 1, further including the step of:

drawing a line in said second video image, said second position being on said line, said step of drawing a line is performed after determining said first position and prior to determining said second position, said line is based on said first position.

29. A method according to claim 1, wherein:

said step of determining said vertical position includes determining a three dimensional location of said object, said vertical position is a vertical component of said three dimensional location.

30. A method according to claim 11, wherein:
said step of finding a second frame is performed automatically in response to said step of finding a first frame, said second frame corresponds in time with said first frame.

31. A method according to claim 13, wherein:
said step of determining said vertical position includes determining a three dimensional location of said object, said vertical position is a vertical component of said three dimensional location.

32. A method according to claim 13, further including the steps of:
receiving a second set of one or more images from a second camera;
automatically finding a second image of said second set of images that depicts said object at said vertical position, said second image corresponds in time with said first image; and
determining a second position of said object in said second image, said step of determining said vertical position is based on said first position and said second position.

33. A method according to claim 32, further including the steps of:
drawing a line in said second image, said second position being on said line, said step of drawing a line is performed after determining said first position and prior to determining said second position, said line is based on said first position.

34. A method according to claim 13, wherein:
said step of determining a first position includes pointing to said first position using a pointing device.

35. A method according to claim 16, wherein:
said step of determining said vertical position includes determining a three dimensional location of said object, said vertical position is a vertical component of said three dimensional location.

36. A method for determining a vertical position of an object, comprising the steps of:
receiving a first image from a first camera;
determining a first position of said object in said first image;
determining said vertical position of said object based on said first position, said step of determining said vertical position includes determining a vector from said first camera to said object and determining a location along said vector, said location includes a vertical component, said vertical position corresponds to said vertical component; and
reporting said vertical position.

37. A method for determining a vertical position of an object, comprising the steps of:
receiving a first image from a first camera;
determining a first position of said object in said first image;
determining said vertical position of said object based on said first position, said step of determining said vertical position includes accessing a table using said first position, said table includes a set of video positions and corresponding height information for said video position; and
reporting said vertical position.

38. One or more processor readable storage devices having processor readable code embodied on said processor readable storage devices, said processor readable code for programming a processor to perform a method comprising the steps of:
receiving a first video image from a first camera and a second video image second camera;
receiving an indication of a first position of said object in said first video image and a second position of an object in said second video image;
determining said vertical position of said object, said step of determining said vertical position includes finding a location at or near the point of closest approach between a first vector and a second vector, said first vector corresponds to said first position and said second vector corresponds to said second position, and
reporting a vertical position of said object.

39. One or more processor readable storage devices according to claim 38, wherein:
said step of determining said vertical position further includes the step of transforming said first vector from a first coordinate system to a second coordinate system and transforming said second vector from a third coordinate system to said second coordinate system, said location is in said second coordinate system.

40. One or more processor readable storage devices according to claim 38, wherein:
said step of receiving an indication includes receiving position data from a pointing device.

41. One or more processor readable storage devices according to claim 38, wherein said step of receiving a first video image includes the steps of:
receiving and storing a first set of video images, including said first video image;
providing on-demand visual access to said first set of video images; and
receiving an indication that said object is at said vertical position in said first video image.

42. One or more processor readable storage devices according to claim 38, wherein said method further includes the step of:
drawing a line in said second video image, said second position being on said line, said step of drawing a line is performed after receiving an indication of said first position and prior to receiving an indication of said second position, said line is based on said first position.

43. An apparatus for determining a vertical position of an object, comprising:
one or more cameras;
a processor in communication with said one or more cameras;
a storage medium in communication with said processor, said storage medium storing code for programming said processor to perform a method of determining the vertical position of the object, the method comprising the steps of:
receiving a first image from a first camera,
receiving an indication of a first position in said first image corresponding to said object at said vertical position, said step of receiving an indication includes receiving position data from a pointing device,
determining said vertical position based on said first position, and
reporting said vertical position.

44. A method according to claim 43, wherein said method further includes the steps of:
receiving a second image from a second camera; and receiving an indication of a second position in said second image corresponding to said object, said step of determining a second position includes receiving additional position data from said pointing device, said step of determining said vertical position is based on said first position and said second position.

45. An apparatus according to claim 44, wherein:

said step of determining a said vertical position includes the steps of:

transforming a first vector corresponding to said first position from a first coordinate system to a second coordinate system and transforming a second vector corresponding to said second position from a third coordinate system to said second coordinate system, and finding a point of closest contact between said transformed vectors.

46. An apparatus according to claim 44, wherein:

said step of determining a second position in said second image includes drawing a line in said second image, said step of drawing a line is performed after receiving an indication of said first position and prior to receiving an indication of said second position, said line is based on said first position.

* * * * *